United States Patent [19]
Evans et al.

[11] Patent Number: 5,920,813
[45] Date of Patent: Jul. 6, 1999

[54] MICROWAVE VIDEO DISTRIBUTION SYSTEM AND ADAPTABLE MICROWAVE TRANSMITTER

[75] Inventors: David H. Evans, Crawley; Ian M. Clarke, Disley, both of United Kingdom

[73] Assignee: U.S. Philips Corporation, New York, N.Y.

[21] Appl. No.: 08/520,280

[22] Filed: Aug. 28, 1995

[30] Foreign Application Priority Data

Aug. 27, 1994 [GB] United Kingdom ............... 9417318

[51] Int. Cl.$^6$ ............................................. H04Q 7/00
[52] U.S. Cl. ................... 455/422; 455/562; 455/524; 455/517; 455/67.1; 342/373; 342/359
[58] Field of Search .................. 455/33.1, 33.3, 455/33.4, 54.1, 54.2, 56.1, 67.1, 67.5, 73, 69, 70, 129, 269, 272, 276.1, 422, 443, 453, 10, 504, 501, 517, 522, 524–525, 63, 561–562; 342/373, 359

[56] References Cited

U.S. PATENT DOCUMENTS

| | | | |
|---|---|---|---|
| 4,747,160 | 5/1988 | Bossard | 455/33.3 |
| 4,777,653 | 10/1988 | Bonnerot et al. | 455/73 |
| 5,212,830 | 5/1993 | Miller | 455/33.3 |
| 5,276,907 | 1/1994 | Meidan | 455/56.1 |
| 5,432,780 | 7/1995 | Smith et al. | 455/562 |
| 5,499,395 | 3/1996 | Doi et al. | 455/561 |
| 5,561,850 | 10/1996 | Makitalo et al. | 455/52.3 |
| 5,602,555 | 2/1997 | Searle et al. | 342/373 |

FOREIGN PATENT DOCUMENTS

| | | |
|---|---|---|
| 0201254A2 | 5/1985 | European Pat. Off. . |
| 0416872A2 | 3/1991 | European Pat. Off. . |
| 0540387A2 | 5/1993 | European Pat. Off. . |
| 8707109 | 11/1987 | WIPO . |
| 8808140 | 10/1988 | WIPO . |
| 9003071 | 3/1990 | WIPO . |
| 9107043 | 5/1991 | WIPO . |
| 9212601 | 7/1992 | WIPO . |

OTHER PUBLICATIONS

MPT 1550: Performance Specification for Analogue Multipoint Video Distribution Systems (MVDS), Transmitters and Transmit Antennas Operating in the Frequency Band 40.5 Ghz–42.5 Ghz, pp. 1–30.
"The M$^3$VDS Saxmundham Demonstratormultichannel TV distribution by mm–waves", British Telecom Technology Journal, vol. 7, No. 1, Jan. 1989, pp. 5–19.
1978 FCC Petition on Xerox Telecom Network, pp. 12–15.
"Local Node Antenna Patterns", pp. 30–32.
Electronics Weekly, Apr. 21, 1993, p. 2.
"29GHz Radio Systems –Safety Consideration".
Electronics World & Wireless World, Dec. 1993, "Antenna Boost for Cellular Phones", p. 974.

*Primary Examiner*—Doris H. To
*Attorney, Agent, or Firm*—Robert J. Kraus

[57] ABSTRACT

In a cell of a microwave cellular video distribution system, e.g a multichannel video distribution system operating at frequencies of around 29 GHz or 40 GHz, the transmitting antenna is composed of individual antenna sectors (62a,62b, 62c . . . ) for transmitting the microwave signal towards different sectors (216a,216b,216c . . . ) of the cell. In accordance with the present invention, a respective monitor (D,R) is present in each of the different sectors (216a,216b, 216c . . . ) of each/the cell to monitor the microwave signal transmitted in that sector. The antenna sectors (62a,62b, 62c . . . ) are individually fed through controllable feed means (59,60,61) which permit individual control of the power level of the microwave signals transmitted by the individual antenna sectors (62a,62b,62c . . . ), including the switching off of that sector. A feedback coupling (40,44,49) is present between each monitor (R,D) and the controllable feed means (59,60,61) of the respective antenna sector (62a,62b, 62c . . . ) to control individually the power levels transmitted towards the different sectors (216a,216b, 216c . . . ) of each cell. In this manner the transmission pattern in each cell can be controlled and adapted to improve the quality of signal reception as requested by subscribers (R), to increase the operational life of the transmitter(s) by minimizing transmitter power, and to enhance responsiveness to other desirable and/or acceptable demands placed on the signal transmission.

8 Claims, 4 Drawing Sheets

MICROWAVE VIDEO DISTRIBUTION SYSTEM AND ADAPTABLE MICROWAVE TRANSMITTER

BACKGROUND OF THE INVENTION

This invention relates to video distribution systems and particularly to such systems operating at frequencies of around 29 GHz or 40 GHz. The invention also relates to adaptable microwave transmitters.

United States Patent Specification U.S. Pat. No. 4,747,160 describes such a video distribution system (in the form of a low power, multi-function cellular television system) comprising a plurality of microwave transmitters each having a transmitting antenna at a node of a respective cell for transmitting a microwave signal in that cell, and subscribing receivers in each cell for receiving the microwave signal transmitted in that cell.

Each cellular transmitting antenna may be composed of individual antenna sectors (see for example the four individual sector antennas 62 of each transmitter station 60 of FIGS. 4A and 5B of U.S. Pat. No. 4,747,160) for transmitting the microwave signal towards different sectors of the cell. The system of U.S. Pat. No. 4,747,160 is a multiple-cell arrangement based on using substantially omni-directional transmitting antennas. Thus, all the individual antenna sectors of a given antenna are fed with the same microwave signal for them to transmit throughout that cell, i.e. the microwave signal has the same power level, frequency, phase and polarization for all the sectors of that omni-directional transmitting antenna.

SUMMARY OF THE INVENTION

It is an aim of the present invention to provide a more versatile video distribution (and a transmitter therefor), either a multi-cellular system or a single cell system, with better adaptability in the transmitter operation and in the signal communication so as to permit an improvement in the quality of signal reception as requested by subscribers, an increase in the operational life of the transmitter(s), and an enhanced responsiveness to desirable and/or acceptable demands placed on the signal transmission.

According to a first aspect of the present invention there is provided a microwave cellular video distribution system comprising a microwave transmitter having a transmitting antenna at a node of the cell for transmitting a microwave signal in that cell, and subscribing receivers in each cell for receiving the microwave signal transmitted in that cell, each transmitting antenna being composed of individual antenna sectors for transmitting the microwave signal towards different sectors of the cell. Such a system in accordance with the invention is characterised in that a respective monitor is respectively present in each of the sectors of the cell to monitor the microwave signal transmitted in that sector, the antenna sectors are individually controllable to change the transmission pattern in the cell, and means are present for coupling an output from the monitor to the transmitter for controlling the microwave signal transmitted towards that sector of the cell by the respective antenna sector in response to the output from the monitor.

According to a second aspect of the present invention there is provided an adaptable microwave transmitter which is suitable for transmitting a microwave signal in a cell of a microwave cellular video distribution system, the transmitter comprising a transmitting antenna composed of individual antenna sectors for transmitting the microwave signal towards different sectors of the cell. Such a transmitter in accordance with the invention is characterised in that each antenna sector has a respective individually controllable feed means for controlling the microwave signal fed to that antenna sector and so permitting the transmission pattern in each cell to be changed by controlling individually the microwave signals transmitted by the individual antenna sectors towards their respective sector of that cell.

According the a third aspect of the invention there is provided a monitor suitable for monitoring a microwave signal in a microwave cellular video distribution system, characterized in that the monitor comprises measuring means for measuring the signal strength of the microwave signal and transmitting means for transmitting information regarding the signal strength to a transmitter.

Thus the present invention is based on a recognition of the advantages which can be obtained by changing the transmission pattern from the microwave transmitting antenna in the (or each) cell in response to requests and demands made by one or more individual monitors in that cell. The invention may be used in a multi-cell system, each cell having a node with its own transmitter. However, the increased versatility provided by the invention can be particularly advantageous in a single cell system. The transmission pattern may be changed by means of a controllable feed arrangement to the antenna sectors which may minimise the transmitter power for achieving that pattern. Thus, the transmission pattern can be adapted to ensure good channel quality to all subscribing receivers requesting a particular service in particular sectors of the cell, while minimising the transmitted power overall in the cell. If there is no demand for a signal within a certain sector of the cell, then the respective transmitting antenna sector need not be switched on. If for any reason the received signal is too weak for a particular receiver within a sector of the cell, the transmission power from that antenna sector may be increased (e.g by redirecting power from a switched-off sector), or perhaps an alternative transmission (e.g from an antenna sector in a neighbouring cell at a different frequency and/or polarisation) may be used to meet the receiver's request.

Minimising the transmitted power can be advantageous for several reasons, as described in more detail with reference to the specific embodiments. Of particular benefit, is the reduction of multi-path propagation within a given cell and co-channel interference between cells. Both multi-path propagation and co-channel interference can degrade the picture quality of a cellular television system. Changing the transmission pattern for this purpose can be effected in response to a monitor output from a subscribing receiver. At least one of the monitors within a cell sector may be a microwave power detector which may be used in a variety of scenarios. Thus, for example, such a detector may be located near a transmitting antenna and may be used to request a reduction in power of the microwave signal transmitted towards that sector when the power monitored by the microwave power detector exceeds a predetermined value. Such a microwave power detector may be used to shut down or reduce the power from a particular antenna sector when, for example, work is being carried out in the vicinity of that antenna sector or when, for example, an intruder is detected in the vicinity of that antenna sector. Minimising the operating power of the transmitter can be beneficial in improving the stability of the transmitter and its component parts, and in increasing their operational life (particularly in the case of tubes such as, for example, travelling wave tubes).

The present invention may be used in centre-fed or edge-fed cellular systems, or even in cellular systems comprising both types of cell. In a centre-fed cellular system an omni-directional transmitting antenna is present at a central node of the cell. In an edge-fed cellular system, a directional transmitting antenna is located at a node on the periphery of the cell. From an operational point of view, it can be advantageous to divide each transmitting antenna into a large number of antenna sectors each having a narrow beam width. However, the optimum number of antenna sectors in any given system depends on a variety of factors, such as: (i) whether the cell is edge-fed or centre-fed (i.e the total antenna beam angle); (ii) overall size limitations for the antenna; (iii) overall transmitter assembly cost due to the complexity of having individually controllable feeds for each antenna sector, as well as (iv) the various operational requirements, including the precise changes required to be made in the signal transmitted by each sector (e.g whether merely switched on and off, whether its power level is attenuated and/or increased, and/or whether switchable to a different frequency). A centre-fed cell requires an omnidirectional antenna with a 360° total beam angle, whereas a total beam angle of 64° may be used for an edge-fed cell. Thus, the omnidirectional antenna can not be divisible into such very small sector widths, as the edge-feeding antenna can be. In general the aperture dimensions of an antenna sector decrease with increase in the frequency, so that a larger number of individual sector beam widths can be accommodated within given overall dimensions when the antenna is for high frequencies such as 29 GHz and preferably even 42 GHz.

In an edge-feeding antenna at these high frequencies, each antenna sector may have a beam width of, for example, less than 10° or even 5°. This use of the invention in connection with an edge-fed cell can be particularly advantageous. The invention may also be used with an omnidirectional antenna, and in this case at these high frequencies each antenna sector may have a beam width of less than 30° or even 20°. However, a smaller number of antenna sectors of wider beam widths may be used. Thus, for comparison with the system of U.S. Pat. No. 4,747,160, there is initially considered the case of a centre-fed cellular system, in which each transmitter comprises four individually controlled antenna sectors corresponding to four quadrants of the cell.

BRIEF DESCRIPTION OF THE DRAWING

These and other features in accordance with the present invention are illustrated specifically in embodiments of the present invention now to be described, by way of example, with reference to the accompanying diagrammatic drawing. In the drawing.

It should be noted that all the drawing figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in the different embodiments.

DESCRIPTION OF THE PREFERRED EMBODIMENTS

Figure 1:
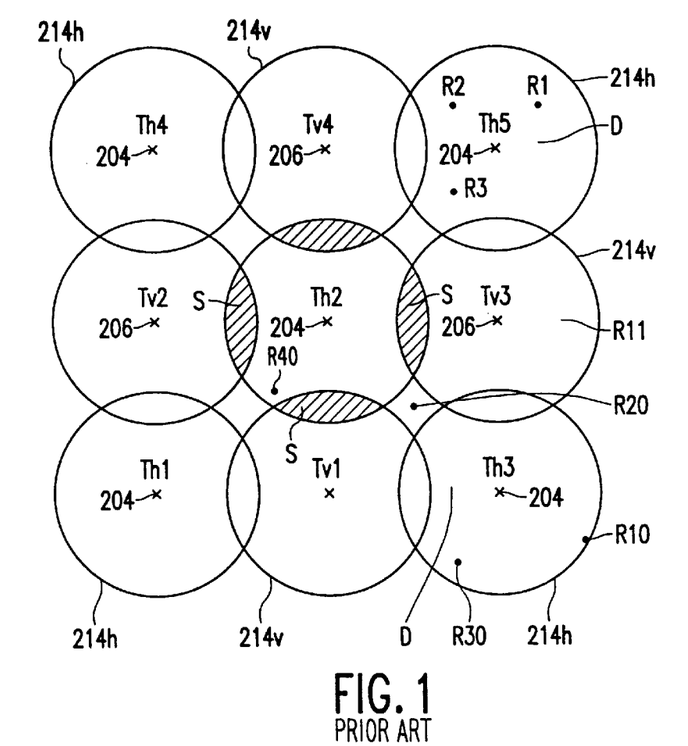
FIG. 1 is a plan view (similar to FIG. 3 of U.S. Pat. No. 4,747,160) illustrating the overall organisation of a microwave multiple cell video distribution system, with respect to individual transmitters and receivers.
Figures 2, 3:
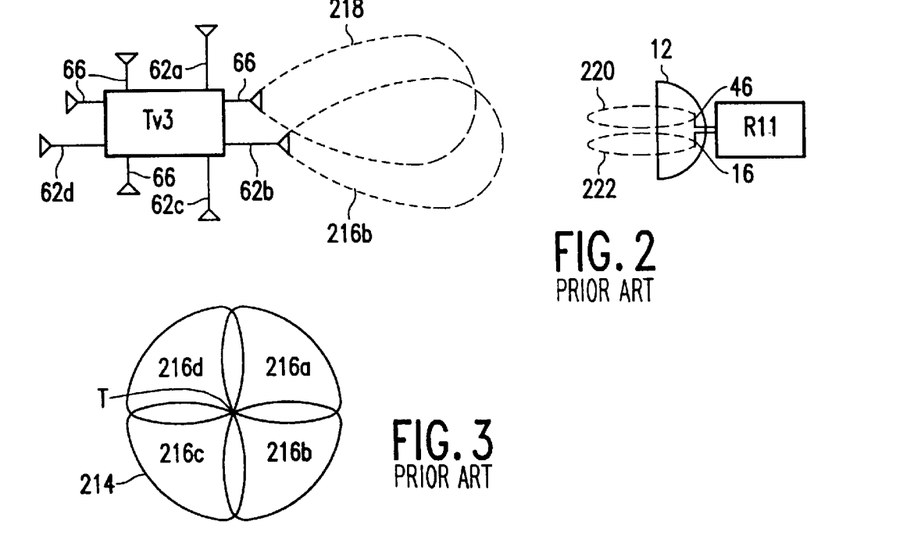
FIG. 2 is a diagram (similar to that of FIG. 4A of U.S. Pat. No. 4,747,160) illustrating the spatial diversity of sectors of the transmitter antenna and a subscriber receiver antenna within a given cell of the system.
FIG. 3 is a plan view of one cell of such a system, illustrating the area coverage of individual sectors in that cell.
Figure 4:
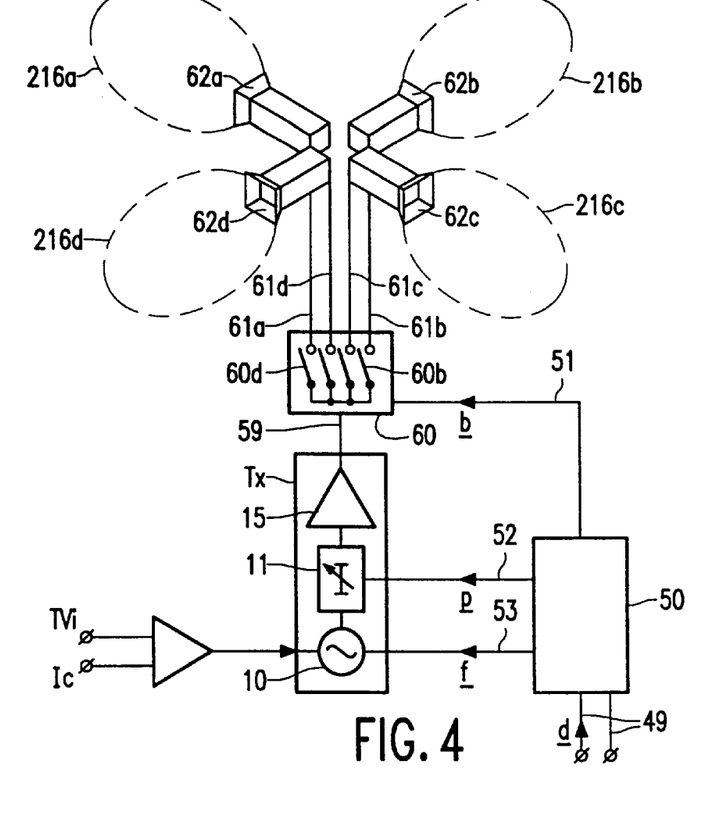
FIG. 4 is a schematic and block diagram of an adaptable transmitter in accordance with the present invention and suitable for providing the sector coverage of FIG. 3.

The microwave cellular video distribution system illustrated in FIGS. 1 to 6 comprises a plurality of microwave transmitters Th and Tv each having a transmitting antenna 62$a$,62$b$,62$c$ . . . at a node 204,206 of a respective cell 214 for transmitting a microwave signal in that cell. The microwave signal transmitted in each cell 214 is received on demand or request by subscribing receivers R1,R2 . . . in that cell. A large number of such subscribing receivers are normally present in each cell 214, but for the sake of clarity and convenience in the drawings only a few receivers R1–R3 are illustrated in some of the cells 214 of FIG. 1. As illustrated in FIGS. 2 and 4. each transmitting antenna 62 is composed of individual antenna sectors 62$a$,62$b$,62$c$ . . . for transmitting the microwave signal towards different sectors 216$a$,216$b$,216$c$ . . . of the cell 214. FIGS. 2,3 and 4 show each antenna 62 and associated cell 214 comprising 4 antenna sectors 62$a$,62$b$,62$c$,62$d$ and 4 cell sectors 216$a$, 216$b$,216$c$,216$d$. The small number of just 4 has been chosen by way of example for convenience and clarity in the drawings of FIGS. 2 and 4 and for simple comparison with U.S. Pat. No. 4,747,160. This embodiment of the present invention may comprise just 4 quadrant sectors as illustrated, or each antenna 62 and cell 214 may comprise a much larger number of sectors (see, for example, FIG. 8).

In accordance with the present invention the antenna sectors 62$a$,62$b$,62$c$ . . . are individually controllable for changing the transmission pattern in each cell 214. These antenna sectors 62$a$,62$b$,62$c$ . . . are individually fed through controllable feed means 59,60,61 (see the Example in FIG. 4) which permit individual control of the power level of the microwave signals transmitted by the individual antenna sectors 62$a$,62$b$,62$c$ . . . . A monitor R and/or D is present in each of the different sectors 216$a$,216$b$,216$c$ . . . of the cell 214 to monitor the transmission of the microwave signal in that sector. A feedback coupling 40,44,49 (see the Example in FIGS. 4 and 5) is present between each monitor R or D and the controllable feed means 59,60,61 of the respective antenna sector 62$a$,62$b$,62$c$ . . . to control individually the power levels transmitted towards the different sectors 216$a$, 216$b$,216$c$ . . . of each cell 214 and thereby to control the transmission pattern in each cell 214 in response to the outputs from the monitors R and D.

The microwave video distribution system of FIGS. 1 to 6 may be a multi-function video distribution system. Except for the systems features associated with the individual control of the antenna sectors 62a,62b,62c . . . of each cell in response to monitors R or D in each sector 216a,216b, 216c . . . of that cell, the system of FIGS. 1 to 6 may be similar to that of the low power multi-function cellular television system which is described in U.S. Pat. No. 4,747, 160. The system in accordance with the present invention may include various additional systems features as described in U.S. Pat. No. 4,747,160, the whole contents of which are hereby incorporated herein as reference material. Thus, for example, the signals transmitted by neighbouring transmitters may be of different polarisation; in the cellular pattern of FIG. 1 a transmitter with horizontal polarisation is designated Th at a node 204 of a cell 214h, and a transmitter with vertical polarisation is designated Tv at a node 206 of a cell 214v.

Recently, two new frequency bands in the microwave region have been allocated for broadcast purposes. These are the bands from 40.5 GHz to 42.5 GHz in CEPT (Conference of European Post and Telecommunication Administrations) countries and from 27.5 GHz to 29.5 GHz in other countries. Specifically for the United Kingdom the relevant standard is MPT 1550: "Performance Specification for Analogue Multipoint Video Distribution Systems (MVDS), Transmitters and Transmit Antennas Operating in the Frequency Band 40.5 GHz–42.5 Ghz." The whole contents of Issue I (September 1993) of this MPT 1550 Performance Specification (published by the Radiocommunications Agency, an executive agency of the UK Government Department of Trade & Industry, London) are hereby incorporated herein as reference material. There are several plans to use these frequency bands for distributing TV programmes direct to the homes of subscribers. The system described in U.S. Pat. No. 4,747,160 preferably operates in the 27.5–29.5 GHz waveband. The system of FIGS. 1 to 6 may be designed to operate in one of these wavebands 27.5 GHz to 29.5 GHz or 40.5 GHz to 42.5 GHz, or at any other frequency authorised by the relevant authorities. When the system is used for low power multi-function cellular television, the TV signal information is applied to an input TVi of the transmitter (see FIG. 4). The TV signal can have an analogue format (e.g PAL, NTCS, or SECAM) or a digital format (e.g MPEG).

The transmitter has a microwave source Tx comprising a microwave oscillator 10. The TV signal fed to the source Tx is modulated and converted up to an RF signal in the desired frequency band, for example 40.5 GHz to 42.5 GHz or 27.5 GHz to 29.5 GHz or any other microwave frequencies which are made available for broadcast purposes by the relevant authorities. The RF signal generated by the transmitter source Tx is radiated by the antenna sectors 62a,62b, 62c . . . of the transmitting antenna 62. The transmitted signal 216a, 216b,216c . . . from an antenna sector 62a,62b,62c . . . is received by one or more receivers R1,R2 . . . present in that sector of the cell.

Figure 5:
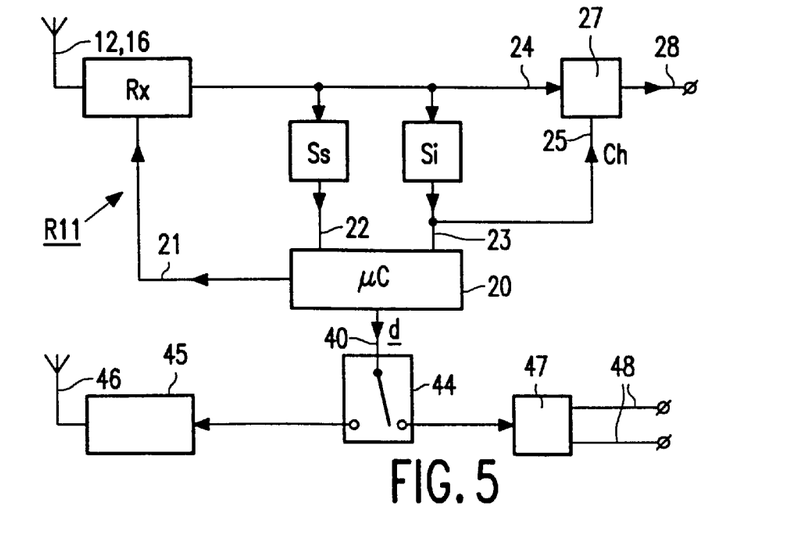
FIG. 5 is a block diagram of a receiver suitable for acting as a monitor in one of the sectors of a cell in a cellular system in accordance with the present invention.

Each subscribing receiver R1,R2 . . . restores the signal information by means of a known down-converter and mixer unit Rx. The output of Rx is combined with TV channel information Ch in a combining circuit 27 whose output 28 is delivered to a television set or video recorder of known type. The output signal from Rx is sampled by circuit unit Ss as regards its signal strength and by circuit unit Si as regards its identification code for the transmitter antenna 62 or antenna sectors 62a,62b,62c . . . This identification code is included in the channel information Ch. Thus, the combining circuit 27 has an input 24 from the mixer unit Rx, an input 25 from the circuit unit Si and an output 28 to a TV set or video recorder.

The receiver also comprises a microcontroller ($\mu$C) 20 which provides channel monitoring data $\underline{d}$ on an output line 40. The microcontroller 20 has inputs 22 and 23 respectively from the units Ss and Si, the information from which forms part of the channel monitoring data d. The microcontroller 20 includes in the data $\underline{d}$ a monitor identification code which identifies the receiver R as regards its sector location. Also included in the channel monitoring data $\underline{d}$ is an identification of the channel frequency being currently received by the unit Rx. The same transmitter T may be configured such that the same antenna 62 or antenna sector 62a,62b,62c . . . may transmit the same TV channel at different frequencies. The microcontroller 20 may also have an output 21 to the receiver unit Rx for setting the channel or frequency of the received signal which is to be decoded by the unit Rx.

In this cellular TV system there is a return channel from each subscribing receiver R1,R2 . . . in a cell 214 to the transmitter T for that cell. This return channel is preferably an interactive channel permitting the subscriber to input information and requests of his or her own choice, for example to request transmission of a particular pre-recorded video, or to purchase advertised goods, or to register a vote in a live interactive television programme. The return channel may be, for example, a low power radio link comprising a radio transmitter 45 and a transmitting antenna 46 of the subscribing receiver R1,R2 . . . and a receiving antenna 66 and receiver of the transmitter T. Such a radio link may operate at a microwave frequency, as already described in U.S. Pat. No. 4,747,160. However, it is advantageous to use a lower frequency radio system, and in particular one which is compatible with an existing radio or telephony standard such as e.g the European Standards of GSM (Global System for Mobile communications) or DECT (Digital European Cordless Telephone) or the USA standard AMPS (Advanced Mobile Phone System) or its British derivative TACS etc. Furthermore, a telephone line link may be used instead of a radio link. Thus the return channel may comprise a telephone-line dialler 47 connected to a telephone line 48. Switching between the telephone link 47,48 and the radio link 45,46 may be achieved using a switching unit 44 on the output line 40.

The switching unit 44 may be controlled automatically by the microcontroller 20 and/or manually by the subscriber himself. Thus, if the microcontroller 20 or the subscriber himself cannot get through to the relevant transmitter T using the microwave link at a particular frequency, it/he/she should assume that there is a fade in the RF signal at that frequency and should try another RF channel or the telephone link.

The return channel includes a corresponding receptor (not shown in FIG. 4) at the transmitter T, for the radio link 45,46 and telephone-line link 47,48 of the receiver. By means of this transmitter receptor, the channel monitoring data $\underline{d}$ from the output 40 of the receiver microcontroller 20 is fed to an input 49 of a microcontroller 50 of the transmitter T (see FIG. 4). The microcontroller 50 receives inputs 49 from all the receivers R and other monitors D in the cell 214 of that transmitter T. There may be a separate input 49 for each sector 216A,216B,216C . . . of the cell. The transmitter controller 50 recognises which monitor R,D in a given sector is supplying given data $\underline{d}$ by the monitor identification code in the data $\underline{d}$.

The microcontroller 50 of each transmitter T also includes in-built logic (possibly in the form of software) for weighting and resolving any conflicts in the requests/demands made on the transmitter. These conflicts may be between requests/demands contained in the channel monitoring data d from different monitors R and D in the cell 214 and/or between one such request/demand and over-riding transmitter operational criteria such as for example the maximum output power of the oscillator source Tx or the maximum transmitter power in any one section 216a,216b,216c . . . .

The transmitter controller 50 has an output 51 providing a beam pattern signal b to a switching unit 60 of the controllable feed means 59,60,61 of the antenna sectors 62a,62b,62c . . . The controller 50 may also have outputs 52 and 53 for providing control signals p and f to regulate the transmitted power and frequencies as described below.

The beam pattern signal b may simply comprise a parallel bit signal for switching on and off respective switches 61a,61b,61c . . . in the respective feeds to the individual antenna sectors 62a,62b,62c . . . from the microwave source Tx. In this way, an individual transmission pattern sector 216a,216b,216c . . . can be switched on in response to a request by a receiver R in that sector 216a,216b,216c . . . . When there are no receivers R requesting transmission in a given cell sector 216a,216b,216c . . . then the antenna sector 62a,62b,62c . . . for that cell sector can be switched off by its respective feed switch 60a,60b,60c . . . under the control of the beam pattern signal b.

In the arrangement illustrated by way of example in FIG. 4, all the antenna sectors 62a,62b,62c . . . are shown as sharing a common microwave source Tx and the control signals p and f are shown as regulating this common source Tx. Thus, in this example, the output power of the microwave oscillator 10 is shown as being regulated by a variable attenuator 11 which is controlled by the signal p of the transmitter controller 50. The oscillation frequency of the oscillator 10 is regulated by the signal f of the transmitter controller 50, for example via a tuning varactor in oscillator 10.

The FIG. 4 arrangement is a particularly low-cost but stable set up. However, other arrangements are possible in which, for example, a control signal e may be fed (possibly combined with the beam pattern signal b) to one or more attenuators in the switching unit 60. Thus, in one form, each switchable feed connection 60a,60b,60c . . . may include a controllable attenuator so that the power levels fed to and transmitted by the individual antenna sectors 62a,62b,62c . . . can be individually regulated. A control signal p for regulating the transmitted may be fed to the power amplifier 15 in order to control the gain of the power amplifier. Alternatively, with a suitable oscillator such as a 3-terminal transistor oscillator, the signal p may be fed to the oscillator 10 itself in order to the control the output power of the oscillator 10.

Figure 7:
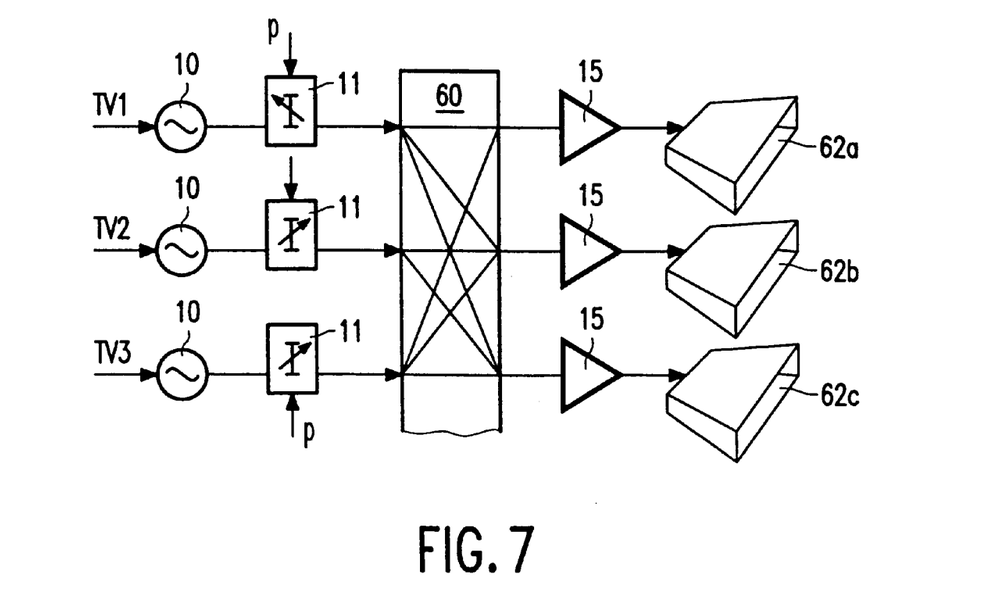
FIG. 7 is a schematic and block diagram of part of another adaptable transmitter in accordance with the present invention, as a modification of the transmitter of FIG. 4.

In the transmitter arrangement of FIG. 4, the attenuated output from the oscillator 10 is amplified by a solid-state power amplifier 15 before being switched by the unit 60 between the various antenna sectors 62a,62b 62c . . . . FIG. 7 illustrates a modification in which the attenuated output from the oscillator 10 is switched by a switch matrix 60 before being amplified by a power amplifier 15. Thus, in this case, the feed to each antenna sector 62a,62b,62c . . . includes its own power amplifier 15. In another arrangement, there may be individual separate oscillators for each antenna sector 62a,62b,62c . . . The arrangement of FIG. 7 illustrates one arrangement in which there is a separate oscillator 10 for each television or video channel TV1,TV2, TV3 . . . which is to be transmitted by the antenna sectors 62a,62b,62c . . . In this case, the transmitter microcontroller 50 regulates the switching matrix 60 in such a way that any channel TV1,TV2,TV3 . . . can be switched as required to any antenna sector 62a,62b,62c . . . The power fed from each oscillator 10 to the switching matrix 60 is regulated by signals p to variable attenuator 11. When two or more antenna sectors 62a,62b,62c etc. are to transmit the same channel as e.g. TV1 then a higher attenuated power is fed from that oscillator 10 to the matrix 60. A further increase in power from a given attenuator field will be required as each additional antenna sector 62c etc is switched in, assuming that it is also desired to preserve the signal power for that channel already being transmitted.

Within any given cell of the cellular system of FIGS. 1 to 5 or FIG. 7, some subscribing receivers may be subject to fading, interference and/or blocking of the transmitted signal. A typical scenario is illustrated in FIG. 6.

Figure 6:
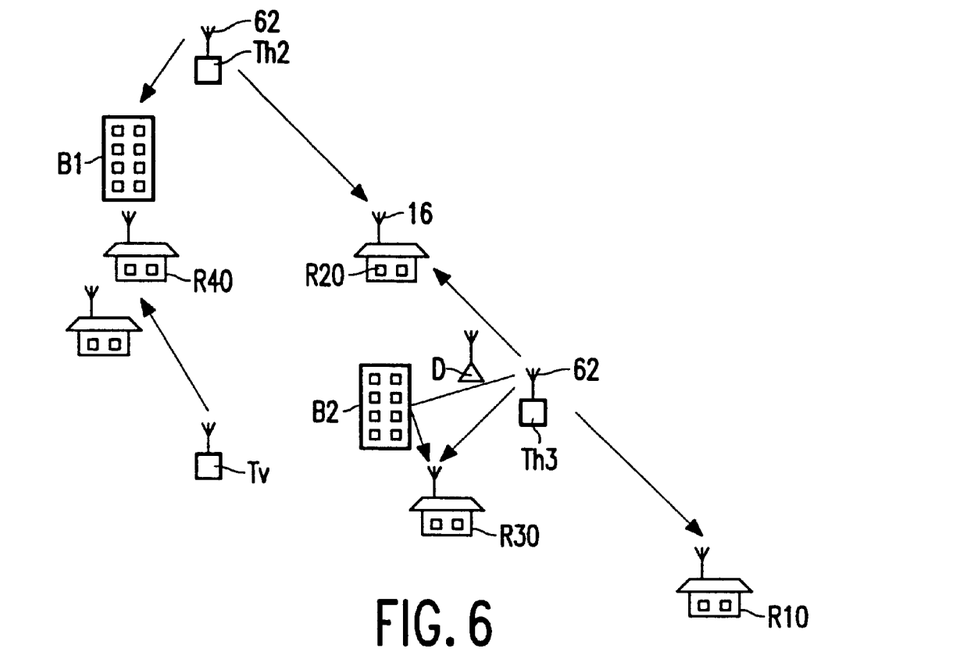
FIG. 6 is a schematic diagram illustrating various transmission scenarios which may occur within a cellular system.

As illustrated in FIG. 6, some subscribers (such as receiver R30) may be subject to multi-path propagation causing severe signal fading. The need for a convenient location of the subscriber's antenna may mean that some subscribers (e.g receiver R40) cannot always obtain a direct line of sight to the nearest base transmitter (e.g Th2). Shadowing from buildings (e.g B1), reflections from buildings (e.g. B2) and from the ground, the motion of objects within the vicinity of the transmitter or receiver, and signal spill-over from adjacent cells (see hatched areas S in FIG. 1) will contribute to poor signal reception. Local atmospheric changes (e.g a local rain storm) may also cause signal fading for some subscribers; in this case it is known from U.S. Pat. No. 4,747,160 for such a subscriber receiver to feed back information to the omni-directional transmitter to increase the output power of the omnidirectional transmitter to compensate for the effect of the rainfall. Especially in such a situation when the output power of one transmitter (e.g Th2 or Th4 in FIG. 1 ) is increased, receivers in other cells may experience co-channel interference which can significantly degrade the received picture quality of the signal. Thus, for example, transmitters Th2, Th3 and Th4 in FIG. 1 are all horizontally polarised and may transmit the same channel signal on the same frequency; when the output power of Th2 and/or Th4 is increased, a receiver (e.g R10 in the cell of Th3 may receive its desired channel signal from both Th3 and Th2/Th4. In this situation R10 (located near a diagonal through Th2, Th3 and Th4) may experience severe co-channel interference, particularly if the signal from Th3 is attenuated, e.g. by reflection or shadowing. In order to reduce this problem, it is preferable for the same channel signal to be transmitted on one frequency by Th2 and another frequency by Th3 and Th4; however, significant co-channel interference for R10 can still occur between Th3 and Th4.

Figure 9:
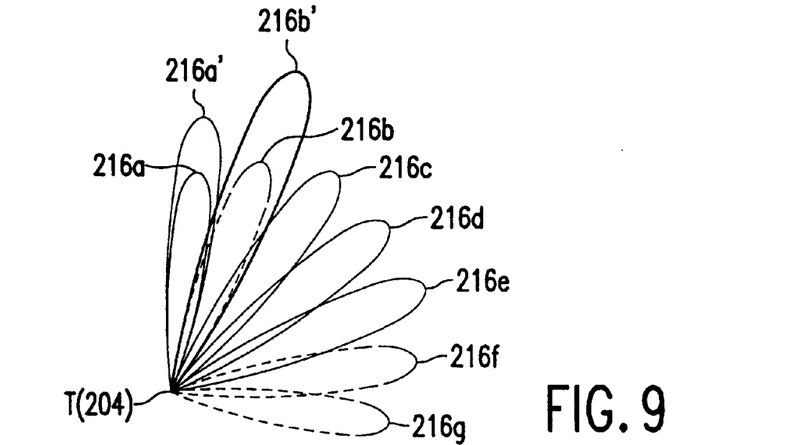
FIG. 9 is a plan view of a transmission pattern in an edge-fed cell in a system in accordance with the present invention.

Such problems can be reduced and/or avoided in some instances by replacing the omnidirectional transmitters of FIGS. 1 to 4 with directional transmitters carefully sited at nodes around the periphery of their respective cells 214. The cells are now edge-fed, instead of centre-fed. FIG. 9 illustrates an example of cell sectors 216a,216b,216c,216g . . . for a single edge-fed cell in such a system in accordance with the present invention. Except for the systems features associated with the individual control the antenna sectors 62a to 62g of each cell in response to monitors R or D in each sector 216a to 216g of that cell, the system of FIG. 9 may be similar to that described in the Article "The M$^3$VDS Saxmundham Demonstratormultichannel TV distribution by mm-waves" in the British Telecom Technology Journal Vol 7 No 1 (January 1989), pages 5 to 19. The FIG. 9 system in accordance with the present invention may include various additional systems features as described in this British Telecom article, the whole contents of which are hereby incorporated herein as reference material. Thus, the transmitter arrangement of FIG. 4 may be modified in this manner to provide a directional (edge-feeding) transmitter in accordance with the present invention.

The present invention provides the transmitter with a further degree of adaptability for reducing and/or avoiding such problems, both for centre-fed and edge-fed cells. Thus, in accordance with the present invention, the transmission pattern 216a,216b,216c . . . in each cell 214 is controllably changed in accordance with requests and demands of subscribers R and other monitors D in each cell, so as to minimise as much as possible the transmitted power within each cell 214 and so reduce the signal fading and interference problems experienced by the receivers R. Thus the present invention adapts the cellular transmitters T in accordance with the recognition that the broadcast requirements within a cellular TV network will vary with subscriber demand and that the transmission within the different sectors 216a,216b,216c . . . of each cell 214 can be adapted to meet this demand. The level of demand is monitored at the transmitters T, by noting the requests for video transmissions from the subscribers R and by using the subscribers' receiving equipment (FIG. 5) as a signal strength monitor (see unit Ss in FIG. 5).

As is known, the transmitter base station for each cell 214 may consist of a series of transmitters T, for example, one transmitter T for each communication channel (or carrier frequency) within the frequency band 27.5 GHz to 29.5 GHz or 40.5 GHz to 42.5 GHz. Such an arrangement is illustrated in FIG. 7. Each transmitter base station may broadcast an identification code which can be recognised by the subscribers equipment. Such an identity code for the transmitter can be combined with other codes, such as an identity code for the channel, and represents only a small increase in the data rate over that already existing in standard subscriber management coding systems. FIG. 4 illustrates an input Ic for combining such an identification code with the TV information signal which modulates the microwave oscillator 10 of the transmitter unit Tx. Each of the monitors R,D in a cell sector 216a,216b,216c . . . has detection means Si for detecting and using that identity code in its output $\underline{d}$ for the respective antenna sector 62a,62b,62c . . . . In the specific example of a receiver R illustrated in FIG. 5, this identification code can be detected in the signal identification unit Si.

In a cellular system in accordance with the present invention, the base station transmitter T for a given cell 214 can make decisions about changing the antenna pattern, increasing or reducing the transmitted power, and/or whether to switch transmission of the channel to another frequency. These decisions are made in accordance with the channel monitoring data $\underline{d}$ fed back to the transmitter T by the subscriber's receiver R serving as a monitoring device. Thus, in addition to being able to receive and demodulate the broadcast TV signals, the subscriber's equipment (e.g as in FIG. 5) is capable of:

(i) determining from which transmitter base station T a signal is being received, by means of the base/channel identification code borne by the carrier of that signal. This can give an indication of the presence of cochannel interference. If a receiver R has a suitable receiving antenna 12,16, the identification code may be used to allow a receiver R to take its required signal from a transmitter base station T in an adjacent cell 214;

(ii) determining the received signal quality, e.g the signal strength and/or modulation or video signal quality;

(iii) rapidly switching the received frequency so as to hop between channels to assess channel quality;

(iv) returning a signal d back to the base T on a radio channel 45,46 or via a telephone line 47,48 or even by passive transponding.

By means of an output signal $\underline{p}$ of the transmitter microcontroller 50 in FIG. 4, the transmitter's output power can be continuously adjusted up or down to ensure that only sufficient power is transmitted to provide a receiver R with an acceptable picture quality. If there is no demand in any given sector 216a,216b,216c . . . of a cell 214, then the controller output $\underline{b}$ to the switching unit 60 interrupts the connection of that antenna sector 62a,62b,62c . . . to the transmitter Tx. Thus, the transmitting antenna sectors 62a, 62b,62c . . . will only broadcast if there is a demand for their signal in their respective sectors.

By means of the output f from the controller 50, the base station transmitter Tx can be controlled to transmit only on frequencies that are known to be free from co-channel interference. Although the level of interference may change continuously, it is monitored by the subscriber's receiver and the channel monitoring data $\underline{d}$ is fed back on the link 40,44,49. Thus, the transmitter's antenna beam pattern 216a, 216b,216c . . . can be continuously adjusted to optimise the broadcast coverage to the subscribing receivers R. Transmitter power can be conserved for those areas where there is no demand. In the 4-quadrant centre-fed example of FIG. 3, if there is a demand for a signal in all sectors of the cell except 216b, then all the other antenna sectors 62a,62c . . . can transmit while the antenna sector 62b is kept switched off. As described below similar situations occur with the sector patterns of FIGS. 8 and 9.

In the arrangement described so far, transmission of a signal by an antenna sector 62a,62b,62c . . . is switched on in accordance with requests received from subscribing receivers R. Each subscribing receiver R functions as a monitor in its respective sector 216a,216b,216c . . . of a cell 214 and comprises means 40,44,49 for feeding back a request signal to the respective transmitter T for requesting transmission of the microwave signal towards that sector 216a,216b,216c . . . of the cell, when such transmission is required at the subscribing receiver R. However monitors provided in a cell sector 216a,216b,216c . . . in accordance with the present invention may also be used to reduce (e.g to switch off) the microwave signal transmitted towards a sector 216a,216b,216c.

Thus, as illustrated in FIGS. 1 and 6, a microwave power detector D may be present in at least one sector of each cell to function as a monitor in that sector. For clarity and convenience in the drawings, such detectors D are shown in only two of the cells 214 of FIG. 1. The microwave power detector D may serve to provide a request signal to the respect transmitter T for requesting a reduction in power of the microwave signal transmitted towards that sector 216a, 216b,216c . . . , when the power of the microwave signal monitored by that microwave power detector D exceeds a predetermined level. The power density of the transmitted signal from an antenna is found to peak at a short distance from the antenna. Thus, for example, the peak power density from a 29 GHz antenna may occur at about 5 meters from the antenna and at a value which is double its value at the antenna. The microwave power detector D may be provided at about the peak density distance from its antenna sector and may serve in accordance with the present invention to shut down or reduce the transmission from that antenna sector when workmen or intruders are in the vicinity. Such a power detector D may include a manual request button for manual operation by the workman and/or an intruder detection alarm. If the detector D is close to the transmitter T, then the feed back coupling from D to T may be along a cable. Otherwise, a coupling 40,44,49 may be used for a radio and/or telephone link.

Figure 8:
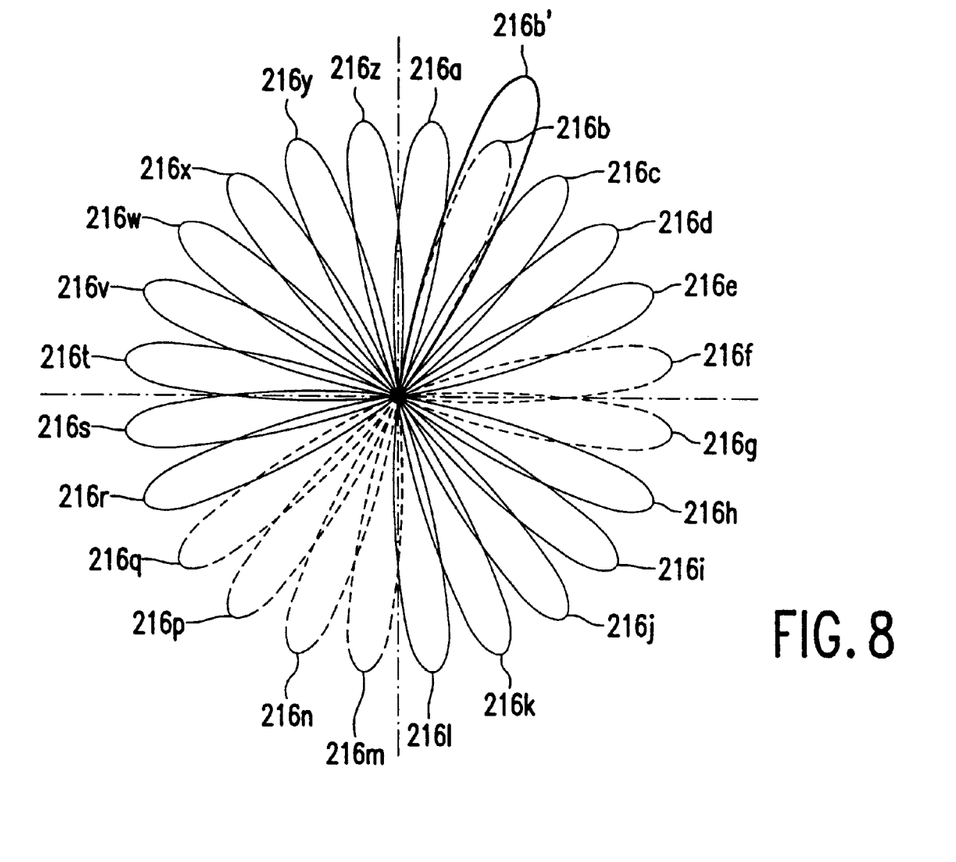
FIG. 8 is a plan view of a transmission pattern within a centre-fed cell in a system in accordance with the present invention.

In the specific example as illustrated in FIGS. 2 to 4, the transmitting antenna is divided into only four controllable sectors 62a,62b,62c,62d. However, it can be advantageous to have more antenna sectors in order to have more control in changing the transmission pattern within a cell 214. FIG. 8 illustrates one such example in which the cell 214 is divided into sectors 216a to 216z. FIG. 8 shows the beam widths of the individual antenna sectors 62a to 62z. These beam widths may be less than 20°, for a 42 GHz antenna. In the transmission pattern of FIG. 8, cell sectors 216f, 216g and 216m to 216q are shown in broken outline to indicate that their respective antenna sectors 62f,62g, and 62m to 62q are switched off. In sectors 216f,216g and 216m to 216q none of the subscribing receivers R are requesting transmission and/or a microwave power detector D is requesting zero transmission. In sector 216b, the transmission power has been increased to cover a wider and longer cell sector 216b'. This increase in transmission power from the antenna sector 62b may be in response to a request from a receiver R (such as R20 or R40 in FIG. 1) just outside the normal range of section 216b, or it may be to a receiver R within sector 216b which is suffering some signal loss, for example as a result of local rainfall. Such an increase in the power level in one sector 216b can be most conveniently provided by using reflective attenuators 11 in the switchable feeds to the antenna sectors 62a,62b,62c . . . Thus, instead of dissipating the unwanted power output for switched-off cell sectors 216f,216g . . . etc in absorbent attenuators 11 as in FIG. 4, the unwanted power output may be diverted from the switched off antenna sectors 62f,62g . . . etc to the antenna sector 62b by means of reflective attenuators 11 included in the switching matrix 60 (e.g as a modification of FIG. 7).

FIGS. 1, 2, 3, 4 and 8 illustrate a cellular system in which the transmitter T at the node of each cell is an omnidirectional transmitter, i.e each of the antenna sectors 62a, 62b,62c . . . transmits the same microwave signal at the same frequency and in phase into their respective cell sectors 216a,216b,216c . . . which together cover 360° around the transmitter T. The difference in the transmissions from the different antenna sectors 62a,62b,62c . . . is that from some sectors there may be no transmission, whereas from other sectors there is normal transmission, or the transmission power may be increased or decreased compared with the normal power level for the cell.

FIG. 9 illustrates a more advantageous cellular system in which each cell is edge-fed rather than centre-fed. FIG. 9 shows the area of one cell, but the total system may comprise a large number of cells, covering a large total area. In this case, the transmitter T is directional and is located at an edge of the cell. The transmitting antenna is again divided into sectors e.g 62a to 62g so that the cell is also composed of sectors 216a to 216g. In this case, the normal transmission power levels vary across the antenna sectors 62a to 62g in order to provide total cell coverage. Thus for total cell coverage, the normal power levels for the edge sectors 216a,216b,216g,216f are less than those for the inner sectors 216d,216c,216e. FIG. 8 shows a transmission pattern in which there is no transmission in sectors 216f and 216g, either because no receiver R in these sectors is requesting transmission or because a microwave level detector D in these sectors is requesting no transmission. In sectors 216a and 216b, the transmission power has been increased so that the sectors increase in area to 216a' and 216b', thereby increasing the transmission signal level in the sectors 216a' and 216b' and/or increasing the range of these sectors. The increased power level in sectors 216a and 216b may be obtained conveniently using reflective attenuators 11 to divert the unwanted signal from antenna sectors 216f and 216g to antenna sectors 216a and 216b where it is wanted.

A modification of the centre-fed cell of FIG. 8 is also possible to form a hybrid centre-fed "edge-fed" type cell. In this hybrid form, some of the antenna sectors 61,62b,62c . . . may transmit at different frequencies from the others. The signals carried out at different frequencies may be the same TV channel, or different TV channels (e.g from different oscillators 10 of TV1,TV2,TV3, etc in FIG. 7) as requested by subscribing receivers R in their respective cells sectors 216a,216b,216c etc. Such an arrangement can be particularly advantageous for transmitting a minority-interest channel, or an individual video film, as requested by only one or two sector receivers R in the cell.

Instead of the circular transmission patterns shown in FIGS. 1 and 8, the transmission patterns may be almost square so as to minimize the overlaps and to in fill the corners.

It will be evident that many modifications and variations are possible within the scope of the invention. In the systems described so far ,the direction of each antenna sector is fixed. However, it is possible to provide antennas which permit the transmitted beam directions to be shifted and steered. In this case, one cell sector transmission, e.g 216a, may be angularly shifted slightly to transmit to a receiver R normally lying just inside the next sector, e.g 216b.

In the example described with respect to FIG. 5, an active radio link 45,46 and/or a telephone line link 47,48 is used to provide the return channel from the monitor R,D to the transmitter T. However, a cellular system in accordance with the present invention may be designed to use passive transponding of the transmitted signal in a cell sector to promote a return channel, at least by a receiver R or detector D located close to the transmitter T.

From reading the present disclosure, other variations and modifications will be apparent to persons skilled in the art. Such variations and modifications may involve equivalent and other features which are already known in the design, manufacture and operation of video distribution systems and transmission systems of the cellular type and/or at microwave frequencies, and component parts thereof, and which may be used instead of or in addition to features already described herein. Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

We claim:

1. A microwave cellular video distribution system comprising a microwave transmitter having a transmitting antenna at a node of a cell for transmitting a microwave signal channel in that cell, the cell being subdivided into sectors, and substantially stationary subscribing receivers in the cell for receiving the microwave signal channel transmitted in that cell, the transmitting antenna comprising a plurality of individual antenna sectors for transmitting the microwave signal channel into different sectors of the cell, the system further comprising a monitor remote from the transmitting antenna and within one of the sectors of the cell to monitor the strength of the transmitted microwave signal channel present in said one sector at said monitor, the antenna sectors being individually controllable to change the transmission pattern in the cell, and means for coupling an output from the monitor to the transmitter for controlling the microwave signal channel strength transmitted towards said one sector of the cell by the respective antenna sector in response to the output from the monitor so as to minimize the microwave signal channel strength transmitted into said one sector.

2. A system as claimed in claim 1, further characterised in that the transmitting antenna is omnidirectional within the cell, and each antenna sector has a beam width of less than 30°.

3. A system as claimed in claim 1, further characterised in that the transmitter antenna is located on the periphery of the cell, and each antenna sector has a beam width of less than 10°.

4. A microwave cellular video distribution system comprising a microwave transmitter having a transmitting antenna at a node of a cell for transmitting a microwave signal channel in that cell, the cell being subdivided into sectors; substantially stationary subscribing receivers in the cell for receiving the microwave signal channel transmitted in that cell, the transmitting antenna comprising a plurality of individual antenna sectors for transmitting the microwave signal channel into different sectors of the cell, the system further comprising a monitor within at least one of the sectors of the cell to monitor the strength of the microwave signal channel transmitted into said one sector, the antenna sectors being individually controllable to change the transmission pattern in the cell, and means for coupling an output from the monitor to the transmitter for controlling the microwave signal channel strength transmitted towards said one sector of the cell by the respective antenna sector in response to the output from the monitor and further characterised in that the microwave signal channel is not transmitted towards a sector unless a subscribing receiver in that sector requests transmission of the microwave signal channel towards that sector and each subscribing receiver functions as a monitor in its respective sector of the cell and comprises means for feeding back a request signal to the transmitter for requesting transmission of the microwave signal towards that sector of the cell when such transmission is required at the subscribing receiver.

5. A microwave cellular video distribution system, comprising:

a cell divided into a plurality of cell sectors;

a microwave transmitter;

a microwave transmitting antenna at a node of the cell for transmitting a microwave video signal from the microwave transmitter into the cell sectors, the antenna having a plurality of antenna sectors, each different antenna sector corresponding to and capable of transmitting a microwave signal channel into a different one of the cell sectors, the power of the microwave signal channel being transmitted by each antenna sector into the cell sector corresponding thereto being controllable;

substantially stationary subscribing receivers in the cell for receiving the microwave signal channel transmitted into the cell;

a monitor within at least one of the subscribing receivers for monitoring the strength of the microwave signal channel received by said subscribing receiver having the monitor and for generating a signal indicative of the microwave signal channel strength at said subscribing receiver having the monitor;

means for coupling said monitor-generated signal to the microwave transmitter; and means for controlling the power of the microwave signal channel transmitted by the antenna sector that corresponds to the cell sector containing the subscribing receiver having the monitor in response to the monitor-generated signal.

6. A system as claimed in claim 5, further characterised in that a microwave power detector is present in at least one sector of the cell to function as a monitor in that sector, and the microwave power detector serves to provide a request signal to the transmitter for requesting a reduction in power of the microwave signal transmitted towards that sector of the cell, when the power of the microwave signal monitored by the microwave power detector exceeds a predetermined level.

7. A system as claimed in claim 5, further characterised in that the individual antenna sectors are individually controllable by respective switch means which serve for switching on and off the microwave signals transmitted by that antenna sector.

8. A system as claimed in claim 5 and having a plurality of cells, further characterised by a plurality of transmitters each at the node of a respective cell and a plurality of monitors each within a sector of a respective cell, wherein the microwave signals transmitted by an individual transmitter include an identity code for that individual transmitter, and each of the monitors have detection means for detecting and using that identity code.

* * * * *